(12) United States Patent
Feng et al.

(10) Patent No.: US 10,001,930 B2
(45) Date of Patent: Jun. 19, 2018

(54) HIGH-EFFICIENT PACKET I/O ENGINE FOR COMMODITY PC

(71) Applicant: Macau University of Science and Technology, Macau (MO)

(72) Inventors: Li Feng, Macau (MO); Liang Zhou, Beijing (CN); Zhijun Xu, Beijing (CN); Yujun Zhang, Beijing (CN)

(73) Assignee: Macau University of Science and Technology, Macau (MO)

( * ) Notice: Subject to any disclaimer, the term of this patent is extended or adjusted under 35 U.S.C. 154(b) by 348 days.

(21) Appl. No.: 14/972,047

(22) Filed: Dec. 16, 2015

(65) Prior Publication Data

US 2017/0160954 A1    Jun. 8, 2017

Related U.S. Application Data

(60) Provisional application No. 62/261,879, filed on Dec. 2, 2015.

(51) Int. Cl.
    *G06F 3/06* (2006.01)
(52) U.S. Cl.
    CPC ............ *G06F 3/0613* (2013.01); *G06F 3/068* (2013.01); *G06F 3/0659* (2013.01)
(58) Field of Classification Search
    None
    See application file for complete search history.

(56) References Cited

U.S. PATENT DOCUMENTS

| | | | | |
|---|---|---|---|---|
| 2004/0059855 A1* | 3/2004 | Yang | ..................... | G06F 13/102 710/260 |
| 2012/0290696 A1* | 11/2012 | Wu | ................... | G06F 17/30091 709/223 |

OTHER PUBLICATIONS

Network Functions Virtualization—Introductory White Paper. In ETSI (2012).
Casado, M., Koponen, T., Shenker, S., Tootoonchian, A. Fabric: a retrospective on evolving sdn. In the first workshop on Hot topics in software defined networks (2012).
(Continued)

*Primary Examiner* — Idriss N Alrobaye
*Assistant Examiner* — Dayton Lewis-Taylor
(74) *Attorney, Agent, or Firm* — Spruson & Ferguson (Hong Kong) Limited

(57) ABSTRACT

A method for implementing a packet I/O engine on a programmable computing platform is provided, where the engine performs I/O functions for plural threads generated by a plurality of user applications. In the method, the platform is configured such that only one thread is permitted to initialize and configure the resources. Furthermore, I/O-device queues each for buffering packets either transmitted to or received from an individual external I/O device are set up. For a plurality of unsafe I/O-device queues determined, among the I/O-device queues, to be multi-thread unsafe, a plurality of multi-producer, multi-consumer software queues for buffering packets delivered between the plurality of the unsafe I/O-device queues and the plurality of user applications is set up. In particular, the plurality of multi-producer, multi-consumer software queues is configured such that the unsafe I/O-device queues are collectively synchronized to maintain data consistency in packet delivery in the presence of multiple threads.

14 Claims, 8 Drawing Sheets

(56) References Cited

OTHER PUBLICATIONS

Dobrescu, M., Egi, N., Argyraki, K., Chun, B., Fall, K., Iannaccone, G., Knies, A., Manesh, M., and Ratnasamy, S. Routebricks: exploiting parallelism to scale software routers. In SOSP (2009), pp. 15-28.

Rizzo, L., Carbone, M., Catalli, G. Transparent acceleration of software packet forwarding using netmap. In IEEE INFOCOM (2012).

Rizzo, L. Netmap: a novel framework for fast packet i/o. In 2012 USENIX conference on Annual Technical Conference (2012), pp. 101-112.

Pfaff, B., Pettit, J., Koponen, T, Amidon, K., Casado, M., and Shenkerz, S. Extending networking into the virtualization layer. In ACM SIGCOMM HotNets (2009).

Kohler, E., Morris, R., Chen, B. Jannotti, J., and Kaashoek, M. The click modular router. In ACM Transactions on Computer Systems (TOCS) (2000), 18(3):263-297.

Deri, L. Improving passive packet capture: beyond device polling. In SANE (2004).

Mogul, J., and Ramarkishnan, K. Eliminating receive livelock in an interrupt-driven kernel. In ACM TOCS (2000), 15(3):217-252.

Han, S., Jang, K., Park, K., and Moon, S. Packetshader: a gpu-accelerated software router. In ACM SIGCOMM Computer Communication Review (2010), 40(4):195-206.

Pongracz. Removing roadblocks from sdn: Openflow software switch performance on Intel DPDK. In 2013 Second European Workshop on Software Defined Networks (EWSDN) (2013).

Bradner, S., Mcquaid, J. Benchmarking methodology for network interconnect devices rfc2544[s].

Covington, G., Gibb, G., Lockwood, J., Mckeown, N. A packet generator on the netfpga plafformk. In 17th IEEE Symposium on Field Programmable Custom Computing Machines (2009), pp. 235-238.

Antichi, G., Pietro, A., Ficara, D., Giordano, S., Procissi, G., Vitucci, F. Design of a high performance traffic generator on network processor. In 11th EUROMICRO Conference on Digital System Design Architectures, Methods and Tools (2008), pp. 438-441.

Vishwanath, Venkatesh, K., and Vahdat, A. Realistic and responsive network traffic generation[c]. In conference on applications, technologies, architectures, and protocols for computer communications, SIGCOMM 06, ACM, 2006.

* cited by examiner

HIGH-EFFICIENT PACKET I/O ENGINE FOR COMMODITY PC

CROSS-REFERENCE TO RELATED APPLICATIONS

This application claims the benefit of U.S. Provisional Patent Application No. 62/261,879, filed on Dec. 2, 2015, which is incorporated by reference herein in its entirety.

BACKGROUND

Field of the Invention

The present invention relates to a method for implementing a packet input/output (I/O) engine on a programmable computing platform having a plurality of resources, and a computer system using the same.

LIST OF REFERENCES

There follows a list of references that are occasionally cited in the specification. Each of the disclosures of these references is incorporated by reference herein in its entirety.

[1] Network Functions Virtualization—Introductory White Paper. In ETSI (2012).
[2] CASADO, M., KOPONEN, T., SHENKER, S., TOOTOONCHIAN, A. Fabric: a retrospective on evolving sdn. In the first workshop on Hot topics in software defined networks (2012).
[3] DOBRESCU, M., EGI, N., ARGYRAKI, K., CHUN, B., FALL, K., IANNACCONE, G., KNIES, A., MANESH, M., AND RATNASAMY, S. Routebricks: exploiting parallelism to scale software routers. In SOSP (2009), pp. 15-28.
[4] RIZZO, L., CARBONE, M., CATALLI, G. Transparent acceleration of software packet forwarding using netmap. In IEEE INFOCOM (2012).
[5] RIZZO, L. Netmap: a novel framework for fast packet i/o. In 2012 USENIX conference on Annual Technical Conference (2012), pp. 101-112.
[6] PFAFF, B., PETTIT, J., KOPONEN, T, AMIDON, K., CASADO, M., AND SHENKERZ, S. Extending networking into the virtualization layer. In ACM SIGCOMM HotNets (2009).
[7] KOHLER, E., MORRIS, R., CHEN, B., JANNOTTI, J., AND KAASHOEK, M. The click modular router. In ACM Transactions on Computer Systems (TOCS) (2000), 18(3):263-297.
[8] DERI, L. Improving passive packet capture: beyond device polling. In SANE (2004).
[9] pfring. http://www.ntop.org/products/pf_ring/.
[10] DPDK Web Site. http://www.dpdk.org/.
[11] MOGUL, J., AND RAMARKISHNAN, K. Eliminating receive livelock in an interrupt-driven kernel. In ACM TOCS (2000), 15(3):217-252.
[12] HAN, S., JANG, K., PARK, K., AND MOON, S. Packetshader: a gpu-accelerated software router. In ACM SIGCOMM Computer Communication Review (2010), 40(4): 195-206.
[13] Linux NAPI. http://www.linuxfoundation.org/collaborate/workgroups/networking/napi/
[14] PONGRACZ. Removing roadblocks from sdn: Openflow software switch performance on Intel DPDK. In 2013 Second European Workshop on Software Defined Networks (EWSDN) (2013).
[15] BRADNER, S., MCQUAID, J. Benchmarking methodology for network interconnect devices rfc2544[s].
[16] TestCenter. http://www.spirent.com/Ethernet_Testing/Software/TestCenter/.
[17] BreakingPoint. http://www.ixiacom.com/products/.
[18] COVINGTON, G., GIBB, G., LOCKWOOD, J., MCKEOWN, N. A packet generator on the netfpga platformk. In 17th IEEE Symposium on Field Programmable Custom Computing Machines (2009), pp. 235-238.
[19] ANTICHI, G., PIETRO, A., FICARA, D., GIORDANO, S., PROCISSI, G., VITUCCI, F. Design of a high performance traffic generator on network processor. In 11th EUROMICRO Conference on Digital System Design Architectures, Methods and Tools (2008), pp. 438-441.
[20] H3C S5024P-EI Gigabits Switch. http://www.h3c.com.cn/Products_Technology/Products/Switches/Park_switch/S5000/S5024P-EI/.
[21] VISHWANATH, VENKATESH, K., AND VAHDAT, A. Realistic and responsive network traffic generation[c]. In conference on applications, technologies, architectures, and protocols for computer communications, SIGCOMM 06, ACM, 2006.

Description of Related Art

Software packet processing on commodity personal computer (PC) is an ideal choice to deploy network applications, especially after the thriving of Network Function Virtualization (NFV) [1]. It is inexpensive to operate, easy to switch between vendors and perfect to accommodate future software innovations [2]. While a significant step forward in some respects, it was a step backwards in others. Flexibility on commodity PC is at the cost of discouraging low performance, which is mainly restricted by packet input/output (I/O) overheads. For example, the sendto( ) system call of FreeBSD averagely takes 942 ns to transmit packets, and RouteBricks (a software router) reports that 66% CPU cycles are spent on packet I/O [3].

To address the issue of costly packet I/O, prior works have anticipated bypassing an operating system and designing novel packet I/O frameworks to take direct control of hardware. Research of [4] demonstrates that replacing raw packet I/O APIs in general purpose OS with novel packet I/O frameworks like Netmap [5] can transparently accelerate software routers, including Open vSwitch [6] and Click [7]. PF_RING [8] is a novel packet I/O framework on commodity PC. Its zero copy version can achieve line rate (14.881 Mpps) packet I/O on 10 Gbit/s link [9]. However, this version is not free for commercial companies or common users. The open-source Netmap usually takes 90 CPU cycles to send or receive packets [5]. But it is not convenient to deploy (sometimes need to re-compile Linux kernel) and suffers packet loss at high frame rate. Intel Data Plane Development Kit (DPDK) [10] is a set of open-source libraries for high-performance packet processing. It reduces the cost of packet I/O to less than 80 CPU cycles [10].

Although many companies (Intel, 6WIND, Radisys, etc.) have already supported DPDK within their products, there is still a need to use the libraries of DPDK to design an efficient packet I/O engine for common users.

In general, there is a need in the art for a technique of implementing a packet I/O engine on a programmable computing platform.

SUMMARY OF THE INVENTION

An aspect of the present invention is to provide a method for implementing a packet I/O engine on a programmable computing platform having a plurality of resources. The packet I/O engine is arranged to perform I/O functions for plural threads generated by a plurality of user applications.

In the method, the platform is configured such that only one of the threads is permitted to initialize and configure the resources. Furthermore, I/O-device queues each for buffering packets either transmitted to or received from an individual external I/O device are set up. For a plurality of unsafe I/O-device queues determined, among the I/O-device queues, to be multi-thread unsafe, a plurality of multi-producer, multi-consumer software queues for buffering packets delivered between the plurality of the unsafe I/O-device queues and the plurality of user applications is set up. In particular, the plurality of multi-producer, multi-consumer software queues is configured such that the unsafe I/O-device queues are collectively synchronized to maintain data consistency in packet delivery when the plural threads are present.

In one embodiment, the platform is DPDK.

Other aspects of the present invention are disclosed as illustrated by the embodiments hereinafter.

BRIEF DESCRIPTION OF THE DRAWINGS

FIG. 3 is a graph plotting throughputs against different batch sizes when the cache option of DPDK is turned on.

DETAILED DESCRIPTION

Figure 1:
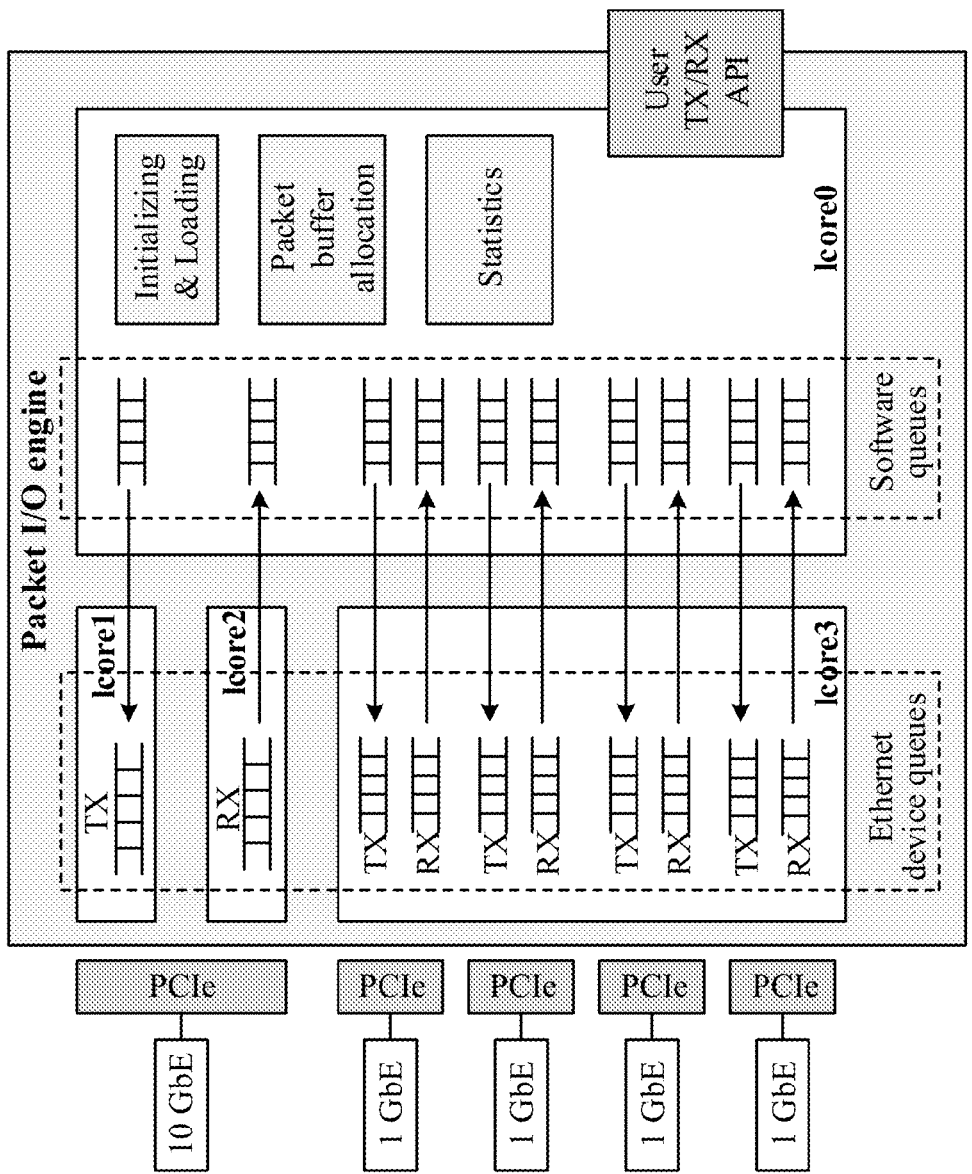
FIG. 1 shows a block diagram illustrating the architecture of DPDK Wrapper, and in addition depicts an implementation of a packet I/O engine thereon in accordance with an exemplary embodiment of the present invention.

As used herein in the specification and appended claims, "a programmable computing platform" is a computer instruction module executable by one or more computing processors and embodying a plurality of resources, wherein the resources are configured to perform computing, controlling, I/O functions, or a combination thereof, and wherein some or all of the resources are reconfigurable according to one or more software codes externally loaded into the platform.

Although the present invention is exemplarily illustrated based on the DPDK Wrapper developed on DPDK as an example, it is understood that the present invention is applicable to a general programmable computing platform and is not limited only to DPDK.

The Inventors argue that the packet I/O engine on commodity PC, mainly processing packet header, should have four properties: low coupling with user applications, multi-thread safe, simple packet I/O API and high-speed packet I/O performance. Such design goal motives us to implement the packet I/O engine called DPDK Wrapper. DPDK Wrapper can bring noticeable performance improvement for I/O-intensive applications on cheap commodity PC. For example, it makes our RFC 2544 benchmark (I/O-intensive) have same testing results as dedicated commercial hardware. Further, DPDK Wrapper can be used to accelerate compute-intensive applications that process both packet header and payload with various complicated and time-consuming actions.

A. Background Knowledge

A.1 Overheads of Standard Packet I/O

Standard packet I/O mechanism in general purpose OS is interrupt-driven. It has three overheads: interrupt handling, buffer allocation and memory copy.

Interrupt Handling.

At high frame rate, interrupt-driven mechanism suffers the problem of receive livelock [11]. Previous works [3], [4], [12] utilize batch processing to mitigate receive livelock. However, some received packets may be dropped if the OS fails to handle interrupt requests timely. Another possible method is replacing interrupt-driven mechanism with polling which periodically checks the arrival of packets on NICs. Its drawback is that we must use custom drivers instead of standard ones. Compromised method is Linux NAPI [13] which uses interrupt to notify the arrival of packets and then uses polling to receive batch of packets.

Buffer Allocation.

Buffer allocation is another time-consuming action. Allocating buffers for transmitted or received packets costs much system resources. Previous works (DPDK, Netmap, PF_RING and PacketShader [12]) all pre-allocate pool of fix-size packet buffers to accelerate this procedure.

Memory Copy.

Memory copy is the last overhead in the procedure of moving packets between physical NICs and user applications. For the reason of abstraction and deferred processing [5], whole packets are usually copied.

A.2 DPDK

Intel DPDK is a set of open-source libraries and drivers aiming at high-speed packet I/O on commodity PC. Currently, it has already supported many PCI NICs and para-virtualization interfaces including e1000 family, ixgbe, virtio-net and etc. DPDK can be applied to many network applications such as OpenFlow switch [14], load balancer and traffic QoS control, to name a few.

DPDK leverages many effective methods to reduce overheads of packet I/O. For interrupt handling, it utilizes polling to avoid the problem of receive livelock. For memory copy, batch of packets are processed in system calls to reduce amortized per packet costs. In DPDK, memory alignment, Hugepage and memory pool are all used to reduce overheads of buffer allocation. It is easy for DPDK to achieve line rate packet I/O on 1 . . . 10 Gbit/s links. Some packet processing functions have been benchmarked up to 160 Mpps [10].

B. DPDK Wrapper

DPDK provides mechanisms and libraries to remove packet I/O related overheads. However, it is the programmer's responsibility to build a high-performance and safe packet I/O engine based on these libraries. Nevertheless, it is not an easy task for a freshman in this field. There are four obstacles for common users, as illustrated as follows.

Complicated Mechanism.

DPDK takes direct control of hardware and system resources. Programmers should be familiar with the packet I/O mechanisms in DPDK, otherwise writing correct program is a tough work.

Multi-Thread Unsafe.

Many system resources in DPDK (Hugepage, TX/RX queues of Ethernet devices, etc.) are not multi-thread safe. Programmers should carefully write their codes to avoid system crash.

Fake Low Performance.

Common users usually lack experience in utilizing libraries of DPDK to achieve high performance. They also do not know how to properly configure parameters.

Different I/O APIs.

Since DPDK operates directly on underlying system resources, packet I/O APIs of DPDK are not the same as the ones in standard Linux. User applications usually have high coupling with libraries of DPDK.

The above-mentioned four problems of DPDK motivates us to design a simple, safe, low-coupling and high-performance packet I/O engine named DPDK Wrapper. Normal users just need to run DPDK Wrapper and replace their raw packet I/O APIs with our similar ones to enjoy high-performance packet I/O.

B.1 Architecture of DPDK Wrapper

Some resources and functions in DPDK are not multi-thread safe. For example, it may result in segment fault or network subsystem crash when more than one threads call the TX/RX functions of Ethernet device queue. The reason is that these multi-thread unsafe functions may cause data inconsistency (wrong descriptor value) in drivers. In order to provide a safer packet I/O environment for applications, only one thread in DPDK Wrapper has the privilege to initialize and configure system resources. Additionally, we add a layer of multi-producer, multi-consumer software queues between unsafe Ethernet device queues and user applications. FIG. 1 depicts the simplified architecture of DPDK Wrapper in the case of having four 1 G NICs and one 10 G NICs. In such architecture, lcore0 responds to the request of packet I/O from applications, and executes dequeue or enqueue actions on corresponding software queues. It also continuously moves packets between Ethernet device queues and software queues.

In DPDK Wrapper, both 1 G and 10 G NICs have only one pair of TX/RX device queues, and such design avoids the problem of synchronization between multiple queues. For 1 G NICs, one CPU core (lcore3) could support four such NICs to undertake line rate (1.488 Mpps) packet I/O. For 10 G NICs, DPDK Wrapper needs two separate CPU cores (lcore1 and lcore2) to achieve line rate (14.881 Mpps) packet transmission and reception, respectively. The line rate throughput of DPDK Wrapper demonstrates that added software queues do not bring performance penalty.

Finally, similar I/O APIs make application migration easier. All the details of DPDK are limited in DPDK Wrapper, and similar I/O APIs bring low coupling between user applications and underlying packet I/O engine.

B.2 Parameter Configuration

For programmers who want to leverage the libraries of DPDK to build high-performance packet I/O engine, it is necessary to configure these libraries with appropriate parameters. These parameters include cache option in memory pool, packet batch size, TX/RX queue size of Ethernet devices, size of memory pool and TX/RX Prefetch, Host, Write-back threshold values. In order to quantify their influence on packet I/O performance, we implement a simple program that repeatedly transmits and receives packets via the packet I/O API of DPDK Wrapper. For different configurations, we measure the TX and RX throughput of DPDK Wrapper. In the present work, all experiments are conducted on the system that equipped with Intel Xeon E5-2620 2.0 GHz CPU and 1333 MHz 8 G memory. The Ethernet interfaces are eight Intel 1350 GbE NICs and two Intel 82599EB 10 GbE NICs. Our experimental results show cache option in memory pool and packet batch size significantly affect packet I/O throughput, and other parameters have little impact on the throughput. In DPDK Wrapper, we configure the above two parameters with optimal values.

Figure 2:
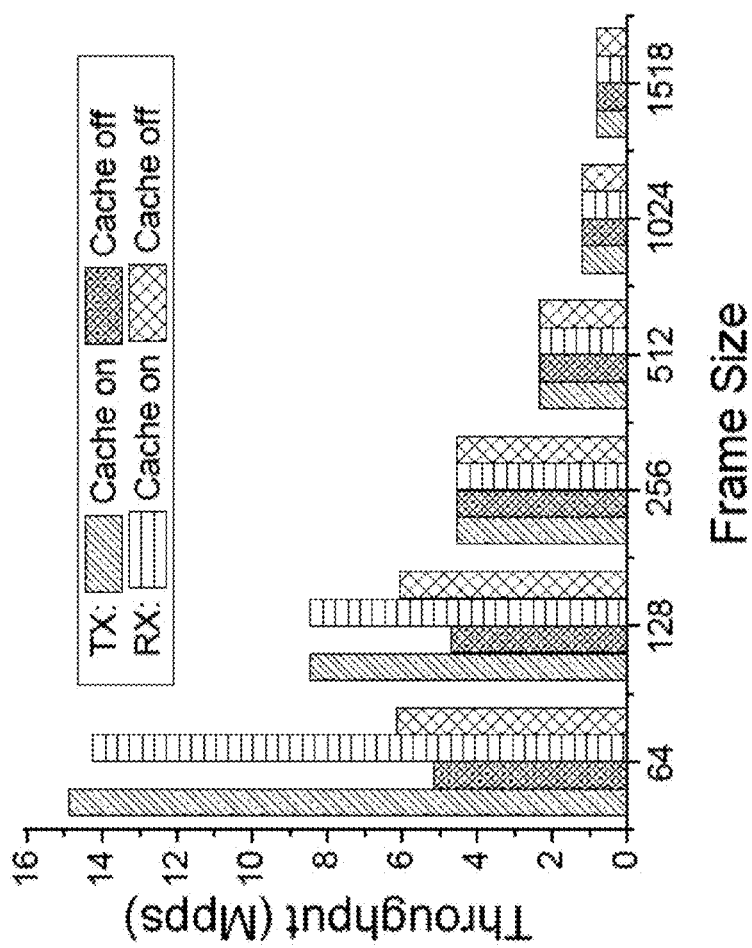
FIG. 2 is a plot showing experimental results of throughputs against different frame sizes of the cache (batch size=16).

The first parameter is cache option in memory pool. The cost of multiple cores accessing the ring of free buffers (with locks) in memory pool is high. Programmers could configure memory pool to maintain a per-core buffer cache at creation time. Allocating buffers from per-core cache and doing bulk requests to ring of free buffers could reduce lock overhead therefore gaining better performance. As illustrated on FIG. 2, the cache option in memory pool has notable influence on both TX and RX throughput of DPDK Wrapper for all frame sizes. For example, the TX throughput with cache off (5.168 Mpps for 64 bytes packet) is about 34.7% of that with cache on (14.881 Mpps for 64 bytes packet). In the case of cache on, the TX throughput (14.881 Mpps for 64 bytes packet) is line rate on 10 Gbit/s link, and the RX throughput (14.255 Mpps for 64 bytes packet) is close to line rate. In DPDK Wrapper, we turn the cache option on.

Figure 3:
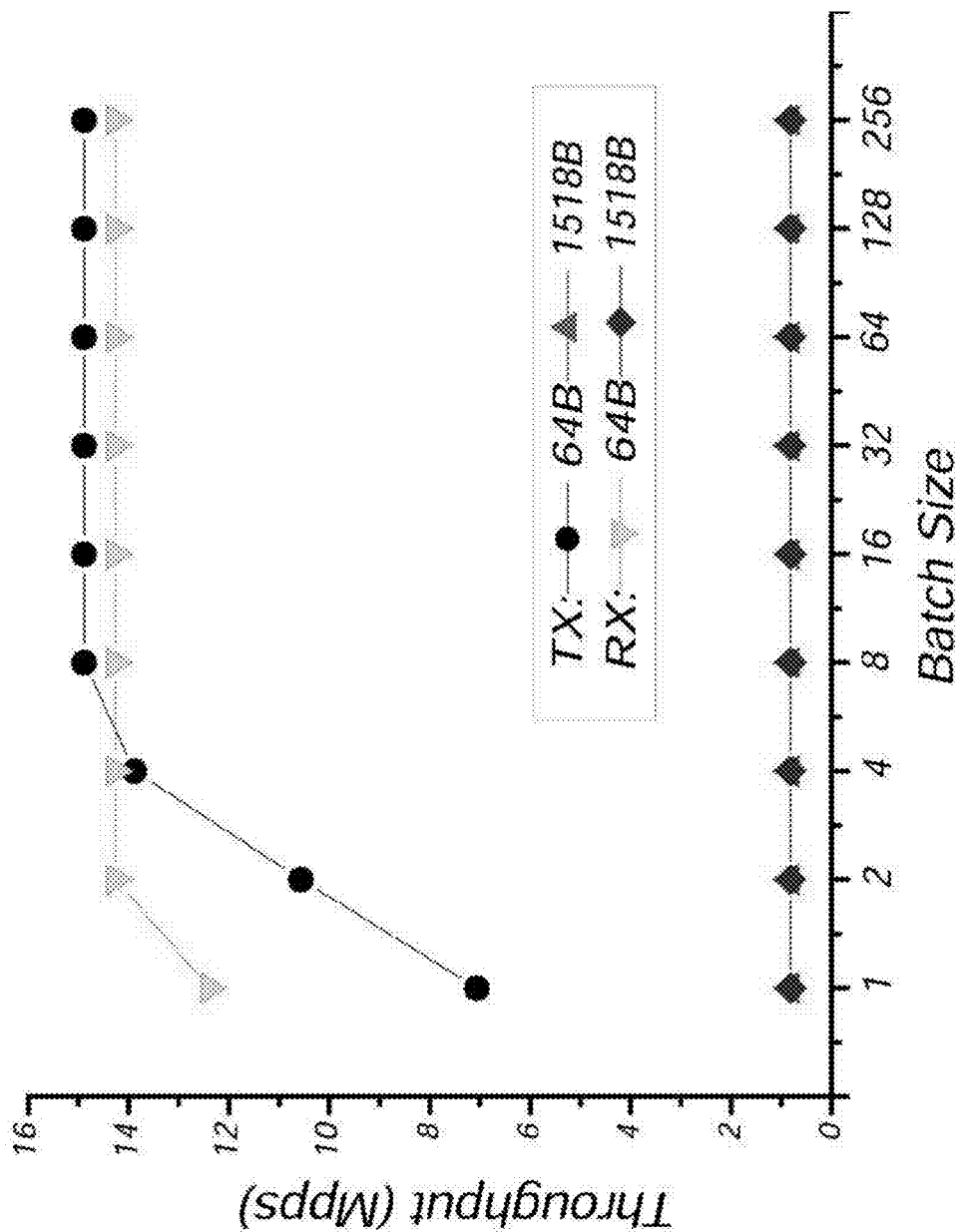

The second parameter is packet batch size. In DPDK, enqueue and dequeue operations process a batch of packets per function call to reduce the amortized costs of every packet. FIG. 3 shows the TX and RX throughput of DPDK Wrapper on different batch sizes. For 1518-byte packets, we see that both TX and RX throughput (0.813 Mpps) are line rate on 10 Gbit/s link. For 64-byte packets, both TX and RX throughput improve when the batch size increases. While TX throughput in packet-by-packet approach (batch size=1) is 7.064 Mpps, the TX throughput (14.881 Mpps) reaches line rate with batch size of 16 and RX throughput (14.255 Mpps) is close to line rate as well. In DPDK Wrapper, we set packet batch size to 16.

B.3 Performance Evaluation and Comparison

Figure 4:
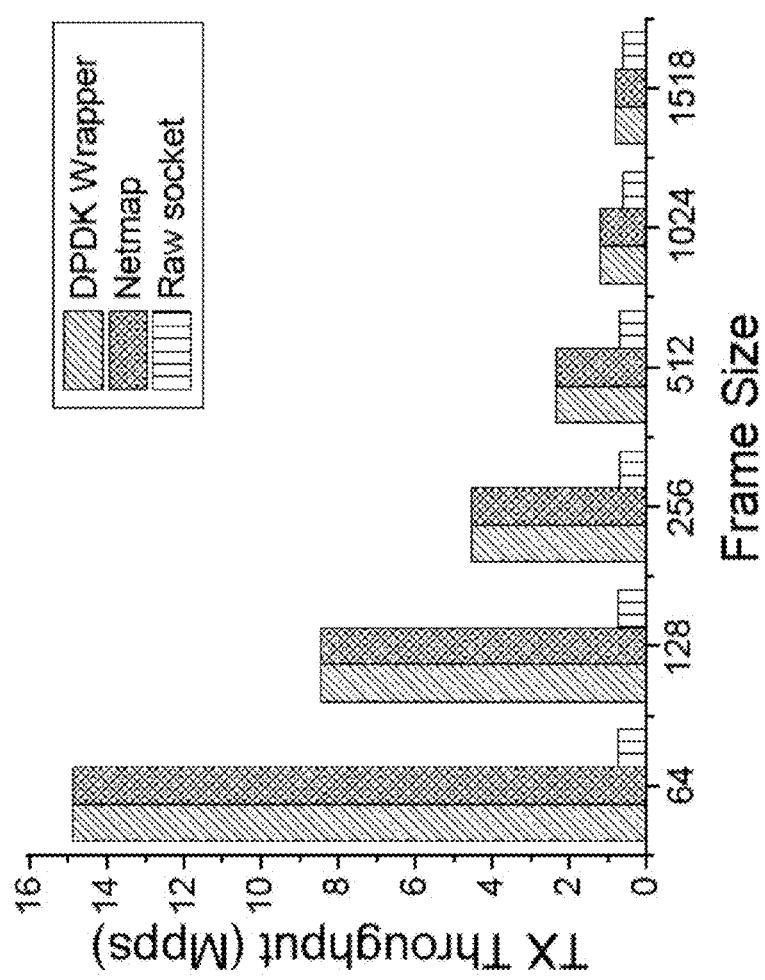
FIG. 4 shows the transmit (TX) throughputs against different frame sizes of the cache.
Figure 5:
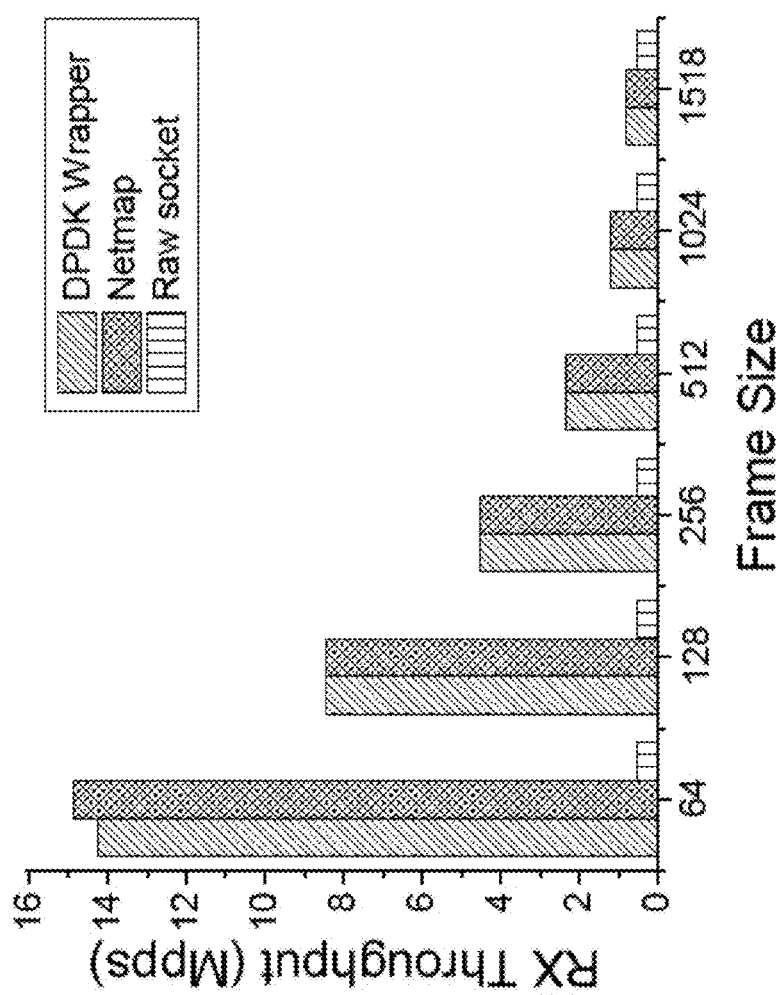
FIG. 5 shows the receive (RX) throughputs against different frame sizes of the cache.

For comparison, we measure the TX and RX throughput of Netmap and Linux raw socket as well. FIGS. 4 and 5 show that both DPDK Wrapper and Netmap have much better TX/RX throughput than Linux raw socket. The TX throughput of DPDK Wrapper and Netmap are line rate (14.881 Mpps for 64 bytes packet) on different frame sizes. The RX throughput of DPDK Wrapper (14.255 Mpps) and Netmap (14.863 Mpps) come close to line rate as well. All the experimental results of DPDK Wrapper are steady values, and the number of lost packets is zero.

Figure 6:
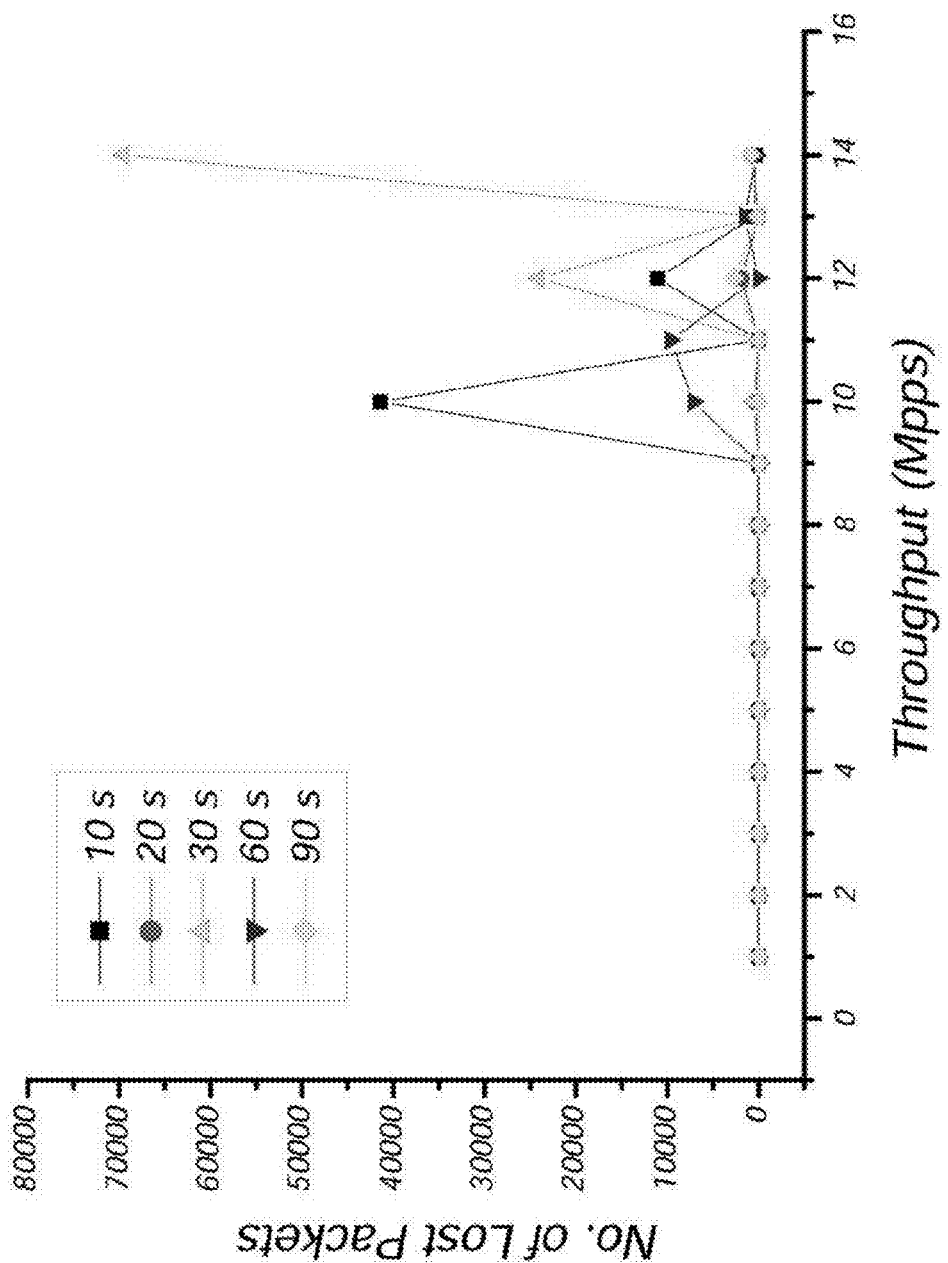
FIG. 6 plots the number of lost packets against the achieved throughput.

However, the high-performance of Netmap is at the cost of packet loss. For the evaluation of packet loss in Netmap, we send a stream of packets (64 bytes) at specific throughput, and count the number of received packets at destination NIC. FIG. 6 depicts the number of lost packets for different throughput and testing time. We find that packet loss occurs randomly when the throughput is larger than 9 Mpps. For example, the numbers of lost packets between 10 Mpps and 14 Mpps are 508, 47, 24104, 10 and 69549 when our program runs 30 second. While the throughput increases, the numbers of lost packets do not increase as well. From the aspect of running time, the number of lost packets in 90 s (794) is not larger than that in 30 s (69549) at throughput of 14 Mpps. In Netmap, packets in a batch are received in per network interrupt. If the OS fails to handle this interrupt timely, this batch of packets would be dropped.

In DPDK Wrapper, we have to point out that the performance gap between RX throughput (14.255 Mpps) and line rate (14.881 Mpps) is not caused by added software queues. The RX queues of Ethernet devices are never full. This means that all received packets in queues are passed to user applications. The real reason is that packet I/O cores do not run fast enough to move all packets from physical NICs to RX queues of Ethernet devices successfully.

C. Case Study

For the evaluation of DPDK Wrapper, an I/O-intensive application was implemented. I/O-intensive applications spend most of time on packet I/O, and undertake simple actions on packet headers.

RFC 2544 benchmark test was selected as the example of I/O-intensive application considered here. The RFC 2544 defines the methodology to test performance (such as throughput, packet loss, back-to-back value, etc.) of network interconnected devices [15]. It is widely used in many performance testing systems such as Spirent TestCenter [16] and BreakingPoint Storm CTM [17]. All these commercial products are built on dedicated physical equipment including NetFPGA [18] and Network Processor [19]. Usually, the benchmark test assembles packets with specific headers and payload, and then moves them to the physical NIC. While receiving packets at the other NIC, the benchmark test analyzes packet headers and timestamps on the payload. The key point of such benchmark test is to generate and receive packets at a high rate.

On a commodity PC, a RFC 2544 benchmark was implemented on the DPDK Wrapper. The only programming effort is about transmitting or receiving packets through the API of the DPDK Wrapper. The performance of a Gigabits Switch (H3C S5024PV2-EI) [20] was tested. Table 1 shows the test results of the switch, and the obtained results are almost the same as those reported for commercial Spirent TestCenter. The benchmark test on the commodity PC achieved the same performance and the same functions of dedicated equipment. The results indicate that the DPDK Wrapper is efficient.

TABLE 1

RFC 2544 test results: benchmark over DPDK Wrapper (DW) and TestCenter (TC).

|    | Frame Size (Byte) | Throughput (Kpps) | Loss rate (%) | Back-to-Back (20s) |
|----|-------------------|-------------------|---------------|--------------------|
| DW | 64                | 1488              | 0             | 29,761,904         |
| TC | 64                | 1488              | 0             | 29,761,905         |
| DW | 128               | 844               | 0             | 16,891,888         |
| TC | 128               | 844               | 0             | 16,891,892         |
| DW | 256               | 452               | 0             | 9,057,968          |
| TC | 256               | 452               | 0             | 9,057,972          |
| DW | 512               | 234               | 0             | 4,699,248          |
| TC | 512               | 234               | 0             | 4,699,249          |
| DW | 1024              | 119               | 0             | 2,394,624          |
| TC | 1024              | 119               | 0             | 2,394,637          |
| DW | 1518              | 81                | 0             | 1,625,472          |
| TC | 1518              | 81                | 0             | 1,625,488          |

D. The Present Invention

An aspect of the present invention is to provide a method for implementing a packet I/O engine on a programmable computing platform having a plurality of resources. The packet I/O engine is arranged to perform I/O functions for plural threads generated by a plurality of user applications.

Figure 7:
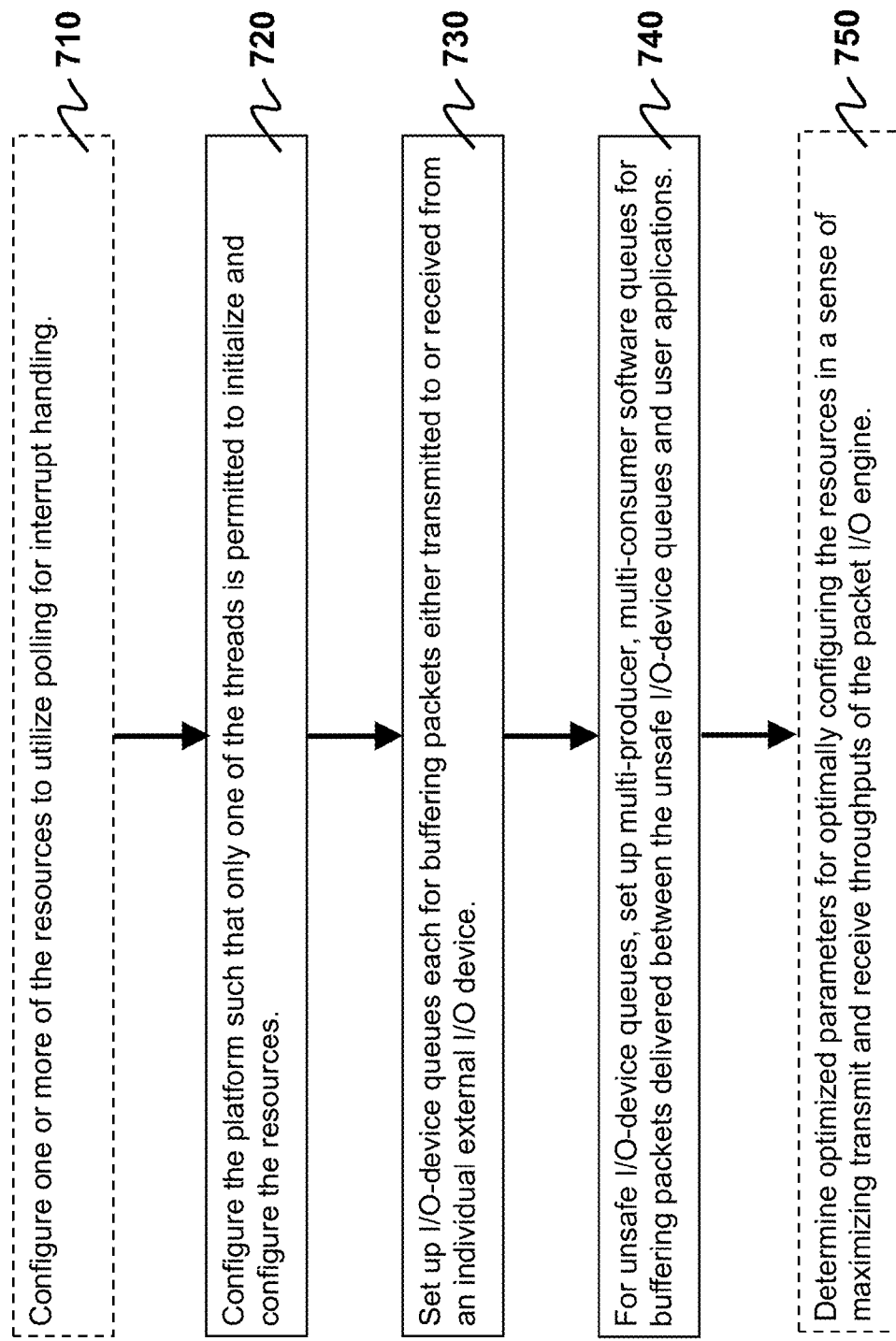
FIG. 7 is a flowchart for exemplarily illustrating the method for implementing a packet I/O engine on a programmable computing platform.

The method is developed according to DPDK Wrapper detailed in Section B, and is illustrated as follows with an aid of FIG. 7, which depicts a flowchart of an exemplary embodiment of the method. In the method, the platform is configured such that only one of the threads is permitted to initialize and configure the resources (step 720). Furthermore, I/O-device queues each for buffering packets either transmitted to or received from an individual external I/O device are set up in the platform (step 730). One key step in implementing the packet I/O engine is that for a plurality of unsafe I/O-device queues among the I/O-device queues and determined to be multi-thread unsafe, a plurality of multi-producer, multi-consumer software queues is set up for buffering packets delivered between the plurality of the unsafe I/O-device queues and the plurality of user applications (step 740). In particular, the plurality of multi-producer, multi-consumer software queues is configured such that the unsafe I/O-device queues are collectively synchronized to maintain data consistency in packet delivery when the plural threads are present. Note that the I/O-device queues and the multi-producer, multi-consumer software queues are implemented on one or more of the resources in the platform.

During initialization of the platform, the platform may be configured such that one or more of the resources may utilize polling for interrupt handling (step 710), as is used in DPDK (see Section A.2).

Furthermore, optimized parameters may be determined for optimally configuring the resources in a sense of maximizing transmit and receive throughputs of the packet I/O engine (step 750). In one embodiment, steps of determining the optimized parameters includes repeatedly transmitting and receiving test packets under different candidate sets of the optimized parameters, and then measuring transmit and receive throughputs of the platform for each of the different candidate sets. From measurement results, the optimized parameters can be determined.

As is indicated in Section B.2, the optimized parameters to be determined may consist only of a cache option in a memory pool, and a packet batch size. Alternatively, the optimized parameters may include one or more of the following: a cache option in a memory pool; a packet batch size; a queue size of each of the I/O-device queues; a size of the memory pool; and transmit/receive Prefetch, Host, Write-back threshold values.

Figure 8:
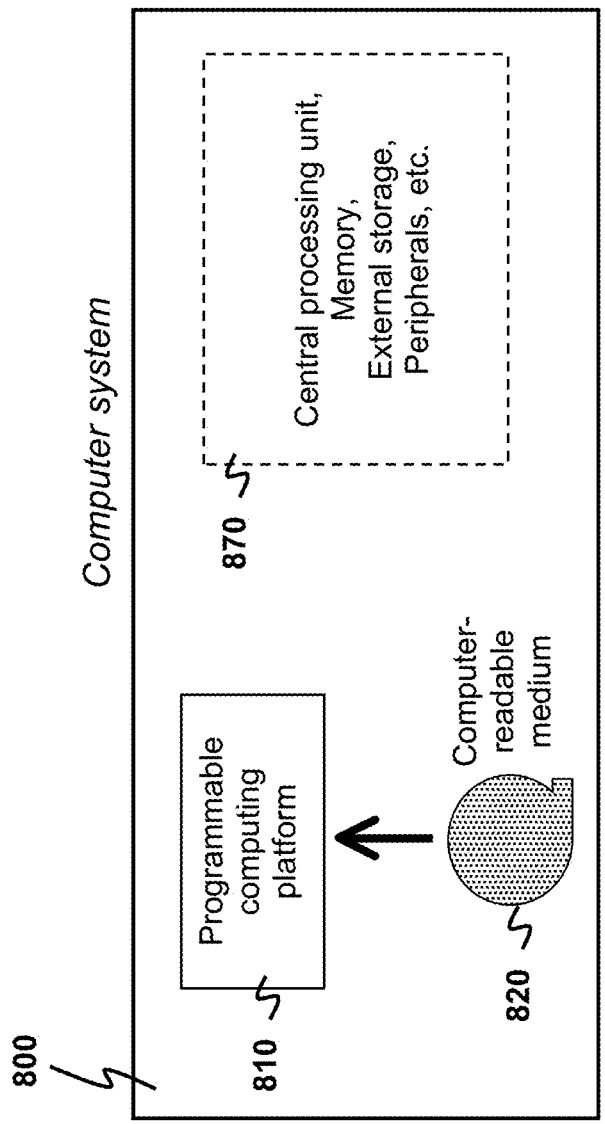
FIG. 8 is a block-diagram schematic showing a computer system that enables a programmable computing platform therein to be configured with a packet I/O engine according to an embodiment of the disclosed method.

Any embodiment of the disclosed method is usable for a computer system having a programmable computing platform to implement a packet I/O engine. The computer system means a computer or a group of interconnected computers. FIG. 8 depicts an illustrative example of such computer system. A computer system 800 comprises a programmable computing platform 810 and other parts 870 of the computer system 800, such as a central processing unit, a memory, an external storage and peripherals. The computer system 800 further comprises a non-transitory computer-readable medium 820. Contents of the medium 820, when executed on the platform 810, causes the platform 810 to execute a process for implementing a packet I/O engine on the platform 810. The process is arranged according to one of the embodiments of the method as disclosed above.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for implementing a packet input/output (I/O) engine on a programmable computing platform having a plurality of resources, the packet I/O engine being arranged to perform I/O functions for plural threads generated by a plurality of user applications, the method comprising:
   determining optimized parameters for optimally configuring the resources in a sense of maximizing transmit and receive throughputs of the packet I/O engine, wherein the determining of the optimized parameters comprises:
      repeatedly transmitting and receiving test packets under different candidate sets of the optimized parameters; and
      measuring transmit and receive throughputs of the platform for each of the different candidate sets;
   configuring the platform such that only one of the threads is permitted to initialize and configure the resources;
   setting up I/O-device queues each for buffering packets either transmitted to or received from an individual external I/O device; and
   for a plurality of unsafe I/O-device queues determined to be multi-thread unsafe among the I/O-device queues, setting up a plurality of multi-producer, multi-consumer software queues for buffering packets delivered between the plurality of the unsafe I/O-device queues and the plurality of user applications, wherein the plurality of multi-producer, multi-consumer software queues is configured such that the unsafe I/O-device queues are collectively synchronized to maintain data consistency in packet delivery when the plural threads are present.

2. The method of claim 1, wherein the optimized parameters consist of a cache option in a memory pool, and a packet batch size.

3. A non-transitory computer-readable medium whose contents, when executed on a programmable computing platform having a plurality of resources, cause the platform to execute a process for implementing a packet input/output (I/O) engine on the platform, the packet I/O engine being arranged to perform I/O functions for plural threads generated by a plurality of user applications, wherein the process is arranged according to the method of claim 2.

4. The method of claim 1, wherein the optimized parameters include one or more of the following: a cache option in a memory pool; a packet batch size; a queue size of each of the I/O-device queues; a size of the memory pool; and transmit/receive Prefetch, Host, Write-back threshold values.

5. A non-transitory computer-readable medium whose contents, when executed on a programmable computing platform having a plurality of resources, cause the platform to execute a process for implementing a packet input/output (I/O) engine on the platform, the packet I/O engine being arranged to perform I/O functions for plural threads generated by a plurality of user applications, wherein the process is arranged according to the method of claim 4.

6. A computer system comprising:
   a programmable computing platform having a plurality of resources, configured to be a packet input/output (I/O) engine for performing I/O functions for plural threads generated by a plurality of user applications; and
   the non-transitory computer-readable medium of claim 5, for configuring the platform to be the packet I/O engine.

7. The method of claim 1, further comprising:
   configuring one or more of the resources to utilize polling for interrupt handling.

8. A non-transitory computer-readable medium whose contents, when executed on a programmable computing platform having a plurality of resources, cause the platform to execute a process for implementing a packet input/output (I/O) engine on the platform, the packet I/O engine being arranged to perform I/O functions for plural threads generated by a plurality of user applications, wherein the process is arranged according to the method of claim 7.

9. A computer system comprising:
   a programmable computing platform having a plurality of resources, configured to be a packet input/output (I/O) engine for performing I/O functions for plural threads generated by a plurality of user applications; and
   the non-transitory computer-readable medium of claim 8, for configuring the platform to be the packet I/O engine.

10. The method of claim 1, wherein the platform is Intel Data Plane Development Kit (DPDK).

11. A non-transitory computer-readable medium whose contents, when executed on a programmable computing platform having a plurality of resources, cause the platform to execute a process for implementing a packet input/output (I/O) engine on the platform, the packet I/O engine being arranged to perform I/O functions for plural threads generated by a plurality of user applications, wherein the process is arranged according to the method of claim 10.

12. A computer system comprising:
   a programmable computing platform having a plurality of resources, configured to be a packet input/output (I/O) engine for performing I/O functions for plural threads generated by a plurality of user applications; and
   the non-transitory computer-readable medium of claim 11, for configuring the platform to be the packet I/O engine.

13. A non-transitory computer-readable medium whose contents, when executed on a programmable computing platform having a plurality of resources, cause the platform to execute a process for implementing a packet input/output (I/O) engine on the platform, the packet I/O engine being arranged to perform I/O functions for plural threads generated by a plurality of user applications, wherein the process is arranged according to the method of claim 1.

14. A computer system comprising:
   a programmable computing platform having a plurality of resources, configured to be a packet input/output (I/O) engine for performing I/O functions for plural threads generated by a plurality of user applications; and
   the non-transitory computer-readable medium of claim 13, for configuring the platform to be the packet I/O engine.

* * * * *